United States Patent [19]

Rumsey

[11] Patent Number: 5,505,283
[45] Date of Patent: Apr. 9, 1996

[54] HIGH CURRENT HARP FOR AN ELECTRIC TROLLEY BUS

[75] Inventor: Steven C. Rumsey, Greer, S.C.

[73] Assignee: Westinghouse Air Brake Company, Wilmerding, Pa.

[21] Appl. No.: 400,807

[22] Filed: Mar. 8, 1995

[51] Int. Cl.⁶ .................................................. B60L 5/08
[52] U.S. Cl. ................................................ 191/59.1
[58] Field of Search ........................... 191/50, 55, 59, 191/59.1, 60, 60.1, 60.2, 60.3, 60.4, 60.5, 61, 62, 65

[56] References Cited

U.S. PATENT DOCUMENTS

| | | | |
|---|---|---|---|
| 1,864,026 | 6/1932 | Moore | 191/59.1 |
| 1,893,383 | 1/1933 | Way | 191/59.1 |
| 2,044,886 | 6/1936 | Larsson | 191/60 X |
| 2,155,242 | 4/1939 | Ryan | 191/59.1 |
| 2,712,041 | 6/1955 | Livingstone | 191/59.1 |
| 2,834,841 | 5/1958 | Waugh | 191/59.1 |
| 2,855,470 | 10/1958 | Waugh | 191/59.1 |

FOREIGN PATENT DOCUMENTS

| | | | |
|---|---|---|---|
| 1463539 | 3/1989 | U.S.S.R. | 191/59 |
| 1641666 | 4/1991 | U.S.S.R. | 191/59.1 |
| 508686 | 6/1939 | United Kingdom | 191/59 |

*Primary Examiner*—David A. Bucci
*Assistant Examiner*—Scott L. Lowe
*Attorney, Agent, or Firm*—James Ray & Associates

[57] ABSTRACT

A harp for an electric trolley bus having a channeled shoe member for sliding engagement with a conducting wire. The channeled shoe member is mounted onto the uppermost member of a ball-and-socket swivel joint, and includes an improved shunt member extending through the lowermost member of the ball-and-socket swivel joint for carrying electric current from the swivel joint to a transmission cable provided to deliver electric current into the trolley bus. The shunt comprises a flexible length of conductive cable, with a graphite contact secured at a first end, and a copper contact secured at a second end, and includes a coil spring to maintain the two contacts biased against their respective adjacent conducting elements, and the graphite contact is adapted to be worn by the swiveling action of the swivel joint to mate with the micro-spherical topography of the adjacent contacting portion of the ball-and-socket swivel joint.

18 Claims, 1 Drawing Sheet

U.S. Patent      Apr. 9, 1996      5,505,283
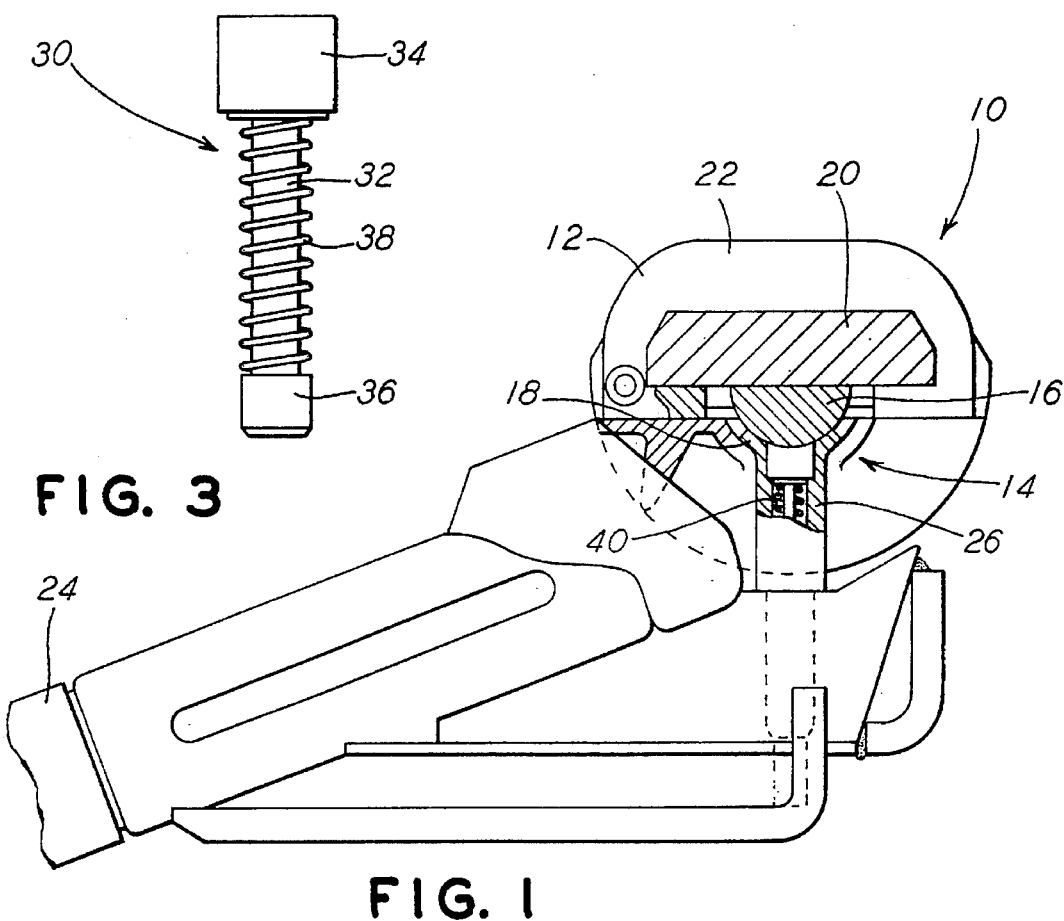
FIG. 3
FIG. 1
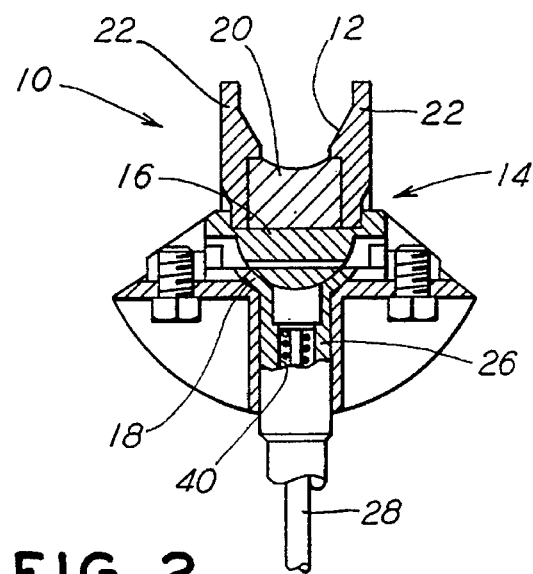
FIG. 2

HIGH CURRENT HARP FOR AN ELECTRIC TROLLEY BUS

FIELD OF THE INVENTION

This invention relates generally to electric trolley bus harps, and more particularly to a unique and improved harp for an electric trolley bus having a high current carrying capacity able to conduct 400 amps RMS continuously, and 800 amps for several minutes at 750 VCD, without the need for an external shunt that can interfere with the swivel action of the harp.

BACKGROUND OF THE INVENTION

It is generally well known that electric trolley buses are powered by a pair of overhead wires which carry an electric current. The wires are aligned in parallel over the main lane of traffic at a generally uniform height over the traffic lane, for the length of the intended bus route. The electric current is transmitted into the bus through a pair of collectors, one each attached at the upper end of a pole pivotally mounted on the bus roof, each of which is spring biased to keep the respective collector pressed upwardly against the proper overhead electric wire. Such a collector, more commonly known in the transit industry as a "harp", includes an electrical contactor mounted onto a ball-and-socket swivel joint, with the electric contactor at an uppermost position to engage the overhead wire. The swivel joint mounting permits the bus to be free to move laterally, from curb to driving lane or lanes; i.e., to permit "touring", and yet allow the electrical contactor, more commonly known in the transit industry as a "shoe", to maintain its engagement with the overhead wire. The ball-and-socket swivel joint not only allows lateral movement of the bus with respect to the overhead wire, but will also compensate for varying angles between the pole and the overhead wire, resulting from pivotal movement of the pole caused by varying heights of the overhead wire. The shoe is normally provided with a channeled contact which serves to keep the shoe in contact with the overhead wire despite limited movement of the bus thereunder. Specifically, such limited movement of the bus with respect to the overhead wires, and the channeled contact of the shoes with the overhead wires, will normally cause the poles to be pivotally moved without causing the shoes to be disengaged from the overhead wires.

Because the electric current must normally be passed through the sliding contact interface surfaces of the ball-and-socket swivel joint, the current conducting capacity of the harp is rather limited. To optimize the current conducting capacity, a shunt is normally provided, which extends through the socket portion of the swivel joint. The shunt is normally spring loaded, so that it will fit tightly between the swivel joint and a transmission conductor therebelow, which is provided to carry the electric current into the bus for purposes of operating the bus. Even with such a shunt, the current conducting capability of such prior art harps have been optimized at about 200 amps RMS continuously, and about 400 amps for periods of several minutes, without damage or overheating.

The newer articulated, transit buses that many transit authorities are now seeking, are essentially fifty percent larger and heavier, and in the case of electric, articulated buses, the current demand is also significantly greater, which may exceed 300 amps RMS continuously. As a result, the harp for articulated, electric buses had to be redesigned, because the prior art harps, as described above, do not have the current conducting capacity as required by such articulated, electric buses. The harps as now used on articulated, electric buses are essentially the same as those prior art harps as described above, except for the fact that they have been modified to include an external shunt, namely, a "by-pass" comprising a flexible conductor cable, one end of which is rigidly bolted to an extension of the socket portion of the swivel joint, with the other end rigidly bolted to the transmission conductor carrying the electric current into the bus. Such an external shunt does provide a solid current path, thereby eliminating the need to conduct current through any sliding contact interface surfaces of the swivel joint. While this has been a solution to the current demand requirements of articulated buses, it has not been a completely satisfactory solution. Specifically, the external shunt, or by-pass cable, as described above, is known to interfere with the swivel action of the ball-and-socket swivel joint. Even though efforts have been made to optimize the flexibility of the cable, and more than sufficient length is provided to span between the contact ends without the possibility of stretching the cable taught, the cable can and does interfere with the swivel action of the swivel joint, often causing the shoe to become disengaged from the electric overhead cable. Any such disengagement requires the bus operator to step outside the bus, and re-engage the harp with the overhead cable. Often times, the external shunt will tend to hold the harp perpendicular to the overhead wire, greatly complicating the bus operator's re-engagement efforts. In this regard, it should be realized that the bus operator cannot manually reach the harp, but must remotely effect such re-engagement, by manually manipulating a non-conductive cable extending downwardly from the pole. Accordingly, there is a need for a harp for an electric trolley bus, and particularly, an articulated, electric trolley bus, having increased current conducting capability which can be achieved without an external shunt that can interfere with the free swivel action of the swivel joint.

SUMMARY OF THE INVENTION

This invention is predicated on my conception and development of an new and improved harp for an electric trolley bus having increased current conducting capability which can be achieved without an external shunt that can interfere with the swivel action of the swivel joint. In essence, the invention is addressed to a new and improved internal shunt that will permit the harp to have a current conducting capacity able to conduct 400 amps RMS continuously, and 800 amps for several minutes at 750 VCD. This is achieved without the use of an external shunt that can interfere with the swivel action of the harp.

In essence, this invention is directed to a more or less conventional harp for an electric transit bus having a channeled shoe member adapted for sliding engagement along an overhead conducting wire, with the shoe member mounted onto a ball portion of a ball-and-socket swivel joint, which in essence forms the harp. As noted above, the ball-and-socket swivel joint is essential to permit a "touring" capability of the bus. The invention is primarily directed to a unique and inventive shunt member which extends through the socket portion of the ball-and-socket swivel joint, for carrying electric current from the ball portion of the swivel joint to a transmission cable adapted to deliver electric current into the bus for normal operation of the bus. The inventive internal shunt primarily comprises, a flexible length of conductive cable, a graphite contact secured at a first end of the flexible length of conductive cable, which is adapted to conductively contact the ball portion of the ball-and-socket swivel joint, and a coil spring compressively mounted to encircle the conductive cable, such that a first end of the coil spring will be biased against the graphite contact to maintain the graphite contact biased against the ball portion of the swivel joint. Ideally, the second end of the coil spring is biased against a copper contact at the other end of the conductive cable to maintain the copper contact in a biased arrangement against the transmission cable which carries the electric current into the trolley bus. Preferably, the contact surfaces of either or both contacts are provided with concave, spherical configurations to better permit mating thereof with adjacent spherical contact surfaces of the respective adjacent contact elements. By virtue of the fact that the contact abutting against the ball portion of the swivel joint is made of graphite, the contact is not only highly conductive, but the contact surface thereof will be readily worn away to provide an exceptionally close fitting contact with the adjacent, pivotal ball portion of the swivel joint to optimize electrical conductivity across the interface. It has been found that a harp having a shunt as disclosed herein is readily capable of having a high current carrying capacity able to conduct 400 amps RMS continuously, and 800 amps for several minutes at 750 VCD, without the need for an external shunt that can interfere with the swivel action of the harp.

OBJECTS OF THE INVENTION

Accordingly, it is a primary object of this invention to provide a new and improved harp for electric trolley buses, having an increased current conducting capability, as necessary for use on articulating, electric trolley buses.

Another object of this invention is to provide a new and improved harp for electric trolley busses, articulating or otherwise, having a high current carrying capacity capable of conducting 400 amps RMS continuously, and 800 amps for several minutes at 750 VCD, without the need for an external shunt that can interfere with swivel action of the harp.

A further object of this invention is to provide a new and improved harp for articulating, electric trolley busses having a current carrying capacity comparable to those harps utilizing external shunts, but without incorporating an external shunt.

Still another object of this invention is to provide a new and improved internal shunt for use in a harp for electric trolley buses, having an increased current conducting capability, as necessary for use on articulating, electric trolley buses.

An even further object of this invention is to provide a new and improved internal shunt for use in a harp for electric trolley busses, articulating or otherwise, having a high current carrying capacity capable of conducting 400 amps RMS continuously, and 800 amps for several minutes at 750 VCD, to thereby eliminate the need for an external shunt that can interfere with swivel action of the harp.

These and other objects and advantages of this invention will become apparent after a full reading of the following detailed description, particularly when read in conjunction with the attached drawings as described below.

BRIEF DESCRIPTION OF THE DRAWINGS

FIG. 1 is a side elevational view partially in cross-section, of a harp pursuant to a presently preferred embodiment of this invention which further illustrates a portion of the pole to which the harp is attached.

FIG. 2 is an end view, partially in cross-section, of the harp illustrated in FIG. 1 which does not illustrate any portion of the pole to which the harp is attached.

FIG. 3 is a side elevational view of a presently preferred embodiment of the shunt as partially illustrated in FIGS. 1 and 2.

DESCRIPTION OF THE PREFERRED EMBODIMENT OF THE INVENTION

Prior to proceeding with a detailed description of the subject invention, it is noted that for the sake of clarity, identical components which have identical functions have been identified with identical reference numerals throughout the several views of the attached drawings.

Reference to FIGS. 1 and 2 will illustrate a presently preferred embodiment of this invention, wherein the harp, generally designated 10, essentially comprises a channeled shoe member 12, mounted onto a conductive metal, ball-and-socket swivel joint, generally designated 14, having a ball portion 16 and a socket portion 18. The channeled shoe member 12 may be comparable to those utilized in the prior art, having an elongated and conductive bus bar 20, adapted for sliding engagement along the under-surface of an overhead electrical wire (not shown), and a pair of non-conductive sidewall members 22, one each extending upwardly on either side of bus bar 20. The non-conductive sidewalls 22 serve as a confinement means to maintain the bus bar 20 aligned under, and in contact with, the overhead electrical wire, even though the transit bus will be "touring" and not staying directly below the overhead wires.

The socket portion 18 of the ball-and-socket swivel joint 14, is secured, directly or indirectly, to the end of a pole 24 which extends diagonally upward and rearward from the roof of the transit bus (not shown). A spring biasing means (not shown) is provided to keep pole 24 biased such that the outward end of the pole 24 upon which harp 10 is attached, will be biased upwardly, against the overhead wire (not shown). The combination of the upward bias and the sidewalls 22, will keep the bus bar 20 biased against the underside of the overhead wire. Normally, the vertical axis of the socket portion 18 of the ball-and-socket swivel joint 14, will be fixed at an angle of about 70 degrees to the centerline of pole 24.

A hollow, vertical stem member 26 extends downwardly from the base of the socket portion 18, of ball-and-socket swivel joint 14, through which a current transmission conductor 28 is inserted. The transmission conductor 28 is normally a conductive, stranded cable, having one end conductively attached to or secured within the socket portion 18 of ball-and-socket swivel joint 14, with the transmission conductor 28 attached to extend from socket portion 18, along pole 24 and into the trolley bus (not shown) for purposes of powering the bus. Accordingly, the electric current for powering the trolley bus (not shown) passes from the overhead cable (not shown), into the bus bar 20 in sliding contact therewith. From the bus bar 20, the electric current passes into the attached ball portion 16 of ball-and-socket swivel joint 14, and then into the socket portion 18 through a swivel interface, and finally into the transmission conductor 28. Because the ball portion 16 and socket portion 18 are not rigidly secured to each other, but rather contact each other through the swiveling interfaces, such an interface provides a limiting feature to the conduction of an electrical current thereacross. Therefore, it has been common practice to include a shunt, which is positioned at the upper end of transmission conductor 28, which extends through socket portion 18 and is biased against a spherical surface of ball portion 14. With this arrangement, the current can be conducted directly from ball portion 14 into the shunt and into transmission conductor 28 without the need for any high current density needing to pass through the socket portion 18. While it is still necessary that the current pass through a swivel interface between the ball portion 16 and the shunt, the shunt, biased against the ball portion 16, will serve to carry the larger share of the current density. As noted previously, such prior art shunts have been optimized to allow the harp to have a current conducting capability of about 200 amps RMS continuously, and about 400 amps for periods of several minutes, without damage or overheating.

While such shunts as described above are known in the prior art, the crux of this invention resides in a new and improved shunt 30 which is positioned between the ball portion 16, of ball-and-socket swivel joint 14, and transmission conductor 28. With reference to FIG. 3, the shunt 30 comprises a short length of flexible, conductive cable 32, preferably a multi-strand, copper cable, having an overall diameter of at least about 0.20 inch. An electrical contact 34, essentially fabricated of graphite, is rigidly and conductively secured to a first end of cable 32, while an electrical contact 36, fabricated of a conductive metal such as copper, is rigidly and conductively secured to the second end of cable 32. Ideally, but not essentially, both electrical contacts 34 and 36 are cylindrical in form. A coil compression spring 38, preferably made of a conductive material such as a phosphorus bronze, is compressively mounted to encircle cable 32, such that a first end of the coil spring 38 will be biased against the graphite contact 34, and the second end of coil spring 38 will be biased against conductive metal contact 36. Accordingly, the two contacts 34 and 36 will be biased away from each other, with cable 32 stretched reasonably taught.

For purposes of housing shunt 30, the socket portion 18 of ball-and-socket swivel joint 14, is provided with an aperture 40 extending downwardly from the base of the socket through stem member 26. The end of transmission conductor 28 is normally fitted up through the lower portion of aperture 40 and secured in place. Accordingly, shunt 30 is fitted within the upper portion of aperture 40 such that conductive metal contact 36 is oriented downward, with the graphite contact 34 uppermost, exposed at the surface of the socket in socket portion 18. When so positioned, and the ball and socket portions joined together to complete the ball-and-socket swivel joint 14, coil spring 38 will bias graphite contact 34 upwardly against the ball portion 16, and concurrently, bias the metal contact 36 downwardly against the end of transmission conductor 28 secured within aperture 40. Obviously, coil spring 38 should have sufficient expendability to keep graphite contact 34 biased against ball portion 16 even after it has been appreciably worn in overall height.

As should perhaps be apparent, the contact end of graphite contact 34 is preferably provided with a concave, spherical surface or depression for purposes of better mating with the spherical surface of ball portion 16 of ball-and-socket swivel joint 14, to enhance the contact surface area, and thereby enhance electrical conductivity. At best, however, such a preformed spherical contact surface will serve to enhance the contacting surface area in a macro-mating relationship. In any event, however, the abradable nature of the graphite contact 34, in combination with the force biasing the contact surface thereof against spherical surface of ball portion 16, will cause such contact surface to be quickly worn down to mate exceptionally well, even with the micro-spherical topography of the ball portion 16, which is essential to optimize electrical conductivity across the interface at values never before obtainable, as noted above. Therefore, while it is not essential to start with the graphite contact 34 having a preformed concave, spherical contact surface, as such will eventually be formed, it is preferred to start with such a surface for the purpose of expediting such a "break-in" period, namely, while the graphite contact 34 is being worn to mate with the micro-spherical topography of the ball portion 16. As the graphite contact 34 continues to wear-down during continued service, coil spring 38 will keep it biased as above-described, to thereby continually maintain the micro-spherical mating relationship, and accordingly, maintain the optimum current conduction ability as above described.

While any desired means can be utilized to optimize conduction across the interface between metal contact 36 and transmission conductor 28, including directly attaching metal contact 36 to transmission conductor 28 with solder, threaded joints, or the like, it has been found that because there is no relative movement between the interfaces, a biasing contact as described above will be adequate without the need to fabricate the contact 36 of graphite. As shown in FIG. 3, a preferred embodiment merely utilizes a conductive metal contact 36, which is biased against the end of transmission conductor 28. Ideally, by utilizing a coil compression spring 38 that will span the length of cable 32, the same spring 38 can be utilized to bias both contacts, namely graphite contact 34 and conductive metal contact 36, against their respective contacting element; i.e., the ball portion 16 in the case of graphite contact 34, and the transmission conductor 28 in the case of contact 36.

For purposes of sizing the unique new shunt 30 for inclusion into more or less conventionally sized harps of the prior art size and configuration, it has been found that the overall length of the shunt 30 should be between about 1 and 2 inches, and ideally about 1 and 5/8 inches, with the diameter of cable 32 being about 0.20 inches. While the diameters of contacts 34 and 36 should be at least about 0.25 inch, it is preferred for purposes of optimizing current carrying capacity, that graphite contact 34 have a diameter of at least about 0.40 inch, and preferably at least 0.47 inch.

In view of the above detailed description of the inventive harp of this invention, it should be apparent the numerous modifications could be made and differing embodiments utilized, without departing from the spirit of the invention. Specifically, as suggested above, any one of a number of differing means can be utilized to conductively connect metal contact 36 with transmission conductor 28. If in fact, the contact end of graphite contact 34 is provided with a concave, spherical surface configuration, ideally that spherical configuration should have a radius if about 0.75 inch to best mate with the radius of the spherical surface of ball portion 16 as utilized in the ball-and-socket swivel joints in the prior art harps.

In addition, the above description illustrates the ball-and-socket swivel joint 14 with the ball portion 16 disposed in the uppermost position. While this is common practice in the prior art, there is no reason why this arrangement could not be reversed so that the socket portion is positioned uppermost. With either arrangement, the interaction would be the same and the results and function would be the same. It should be apparent, therefore, that with regard to the above description of the invention, the position of the ball-and-socket swivel joint 14 could be inverted by 180 degrees without any change in the operation or advantages of the invention. In such a situation the shunt 30 would have to extend through whatever member is lowermost, and conductively contact whatever member is uppermost. Clearly, other modifications could be included and other embodiments designed without departing from the spirit of the appended claims.

I claim:

1. A harp for an electric trolley bus comprising a channeled shoe member adapted for sliding engagement with a conducting wire, said shoe member mounted onto an uppermost member of a ball-and-socket swivel joint, means for securing an end of a transmission conductor to a lowermost member of said ball-and-socket swivel joint, such transmission conductor adapted to deliver electric current into said bus, a shunt member extending through said lowermost member of said ball-and-socket swivel joint, for carrying electric current from said uppermost member directly to such transmission conductor, said shunt comprising;

(a) a flexible length of conductive cable, (b) a graphite contact conductively secured at a first end of said flexible length of conductive cable adapted to conductively contact said uppermost member of said ball-and-socket swivel joint, (c) a conductive metal contact conductively secured at a second end of said flexible length of conductive cable adapted to conductively contact such transmission conductor, and d) a coil spring compressively mounted to encircle said conductive cable, a first end of said coil spring adapted to bias against said graphite contact to maintain said graphite contact biased against said uppermost member of said ball-and-socket swivel joint, a second end of said coil spring adapted to bias against said conductive metal contact to maintain said conductive metal contact biased against such transmission conductor.

2. A harp for an electric trolley bus according to claim 1 wherein said conductive metal contact is fabricated of copper.

3. A harp for an electric trolley bus according to claim 1 wherein said conductive metal contact has a diameter of at least 0.25 inch.

4. A harp for an electric trolley bus according to claim 1 wherein said graphite contact is further adapted to have a contact surface against said uppermost member of said ball-and-socket swivel joint which will be worn, as a result of swiveling action of said ball-and-socket swivel joint, to mate with a micro-spherical topography of said uppermost member.

5. A harp for an electric trolley bus according to claim 1 wherein said graphite contact has a diameter of at least about 0.4 inch.

6. A harp for an electric trolley bus according to claim 1 wherein said length of conductive cable is a copper stranded cable.

7. A harp for an electric trolley bus according to claim 1 wherein said graphite contact is provided with a preformed contact surface having a spherical configuration sized to mate with a macro-spherical configuration of said uppermost member.

8. A harp for an electric trolley bus according to claim 7 wherein said graphite contact has a diameter of about 0.47 inch.

9. A harp for an electric trolley bus according to claim 1 wherein said shunt has a length between about 1-inch and about 2-inches.

10. A harp for an electric trolley bus according to claim 9 wherein said shunt has a length of about 1 and 5/8-inches.

11. A harp for an electric trolley bus according to claim 1 wherein said uppermost member of said ball-and-socket swivel joint is a ball portion, and said graphite contact has a contact surface in contact with said ball portion having a concave spherical configuration adapted to mate with a macro-spherical configuration of said ball portion.

12. A harp for an electric trolley bus according to claim 11 in which said concave spherical configuration has a radius of about 0.75 inch.

13. A harp for an electric trolley bus according to claim 12 in which said contact surface of said graphite contact having a concave spherical configuration is further adapted to be worn, as a result of swiveling action of said ball-and-socket swivel joint, to mate with a micro-spherical topography of said ball portion to enhance electrical conductivity.

14. A harp for an electric trolley bus comprising a channeled shoe member adapted for sliding engagement with a conducting wire, said shoe member mounted onto a ball portion of a ball-and-socket swivel joint, means for securing an end of a transmission conductor within an aperture extending through a socket portion of said ball-and-socket swivel joint, such transmission conductor adapted to deliver electric current into such bus, a shunt member disposed within said aperture for carrying electric current from said ball portion directly to such transmission conductor, said shunt comprising;

(a) a flexible length of conductive cable, (b) a graphite contact conductively secured at a first end of said flexible length of conductive cable adapted to conductively contact said ball portion of said ball-and-socket swivel joint, (c) a conductive metal contact conductively secured at a second end of said flexible length of conductive cable adapted to conductively contact such transmission conductor, and (d) a coil spring compressively mounted to encircle said conductive cable, a first end of said coil spring adapted to be biased against said graphite contact to maintain said graphite contact biased against said ball portion of said swivel joint, and a second end of said coil spring adapted to be biased against said conductive metal contact to maintain said conductive metal contact in bias against such transmission conductor.

15. A harp for an electric trolley bus according to claim 14 wherein said graphite contact has a diameter of about 0.47 inch.

16. A harp for an electric trolley bus according to claim 14 wherein said graphite contact has a contact surface having a concave, spherical configuration adapted to mate with a macro topography of an adjacent spherical contact surface.

17. A harp for an electric trolley bus according to claim 16 in which said concave spherical configuration has a radius of about 0.75 inch.

18. A harp for an electric trolley bus according to claim 16 wherein said contact surface of said graphite contact is further adapted to have said contact surface worn, as a result of swiveling action of said ball-and-socket swivel joint, to mate with a micro topography of an adjacent spherical surface of said ball portion.

* * * * *

UNITED STATES PATENT AND TRADEMARK OFFICE
CERTIFICATE OF CORRECTION

PATENT NO. : 5,505,283
DATED : April 9, 1996
INVENTOR(S) : Steven C. Rumsey

It is certified that error appears in the above-indentified patent and that said Letters Patent is hereby corrected as shown below:

Column 7, line 46, delete "micro-spherical" and insert --macro-spherical--.

Column 8, line 8, delete "macro-spherical" and insert --micro-spherical--.

Signed and Sealed this

Twenty-seventh Day of August, 1996

*Attest:*

BRUCE LEHMAN

*Attesting Officer*    Commissioner of Patents and Trademarks